United States Patent
Fujii

(10) Patent No.: US 9,720,226 B2
(45) Date of Patent: Aug. 1, 2017

(54) MACHINE TOOL INCLUDING VIEWING WINDOW CONTROLLER

(71) Applicant: FANUC Corporation, Yamanashi (JP)

(72) Inventor: Takaaki Fujii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/045,131

(22) Filed: Feb. 16, 2016

(65) Prior Publication Data

US 2016/0236311 A1     Aug. 18, 2016

(30) Foreign Application Priority Data

Feb. 17, 2015      (JP) ................................ 2015-028487

(51) Int. Cl.
| | |
|---|---|
| *G02B 1/00* | (2006.01) |
| *G02B 27/00* | (2006.01) |
| *B23Q 11/00* | (2006.01) |
| *B23Q 11/08* | (2006.01) |

(52) U.S. Cl.
CPC ...... *G02B 27/0006* (2013.01); *B23Q 11/0089* (2013.01); *B23Q 11/0891* (2013.01)

(58) Field of Classification Search
CPC   G02B 27/00; G02B 27/0006; B23Q 11/0825; B23Q 11/0891; B23Q 11/0089; B23Q 11/08

USPC ....................................... 359/507, 508, 509
See application file for complete search history.

(56) References Cited

U.S. PATENT DOCUMENTS 5,161,055 A  *  11/1992   Blechschmidt .... B23Q 11/0891
                                                                                      359/508

FOREIGN PATENT DOCUMENTS

JP            61-184644 A      8/1986

* cited by examiner

*Primary Examiner* — Euncha Cherry
(74) *Attorney, Agent, or Firm* — Hauptman Ham, LLP

(57) ABSTRACT

According to an instruction of opening or closing a block plate from a controller, a first solenoid valve and a second solenoid valve supply compressed air supplied from an air source to an air cylinder to operate a block in a uniaxial direction. The block plate is attached to the block, and the block plate operates similarly to the block in response to the operation of the block. In other words, by the opening or closing operation of the block plate, a state can be switched between a state in which a machining area can be seen through a viewing window, which is attached to a splash guard (or an opening/closing door) of the machine tool, and a state in which the machining area cannot be seen through the viewing window.

4 Claims, 4 Drawing Sheets

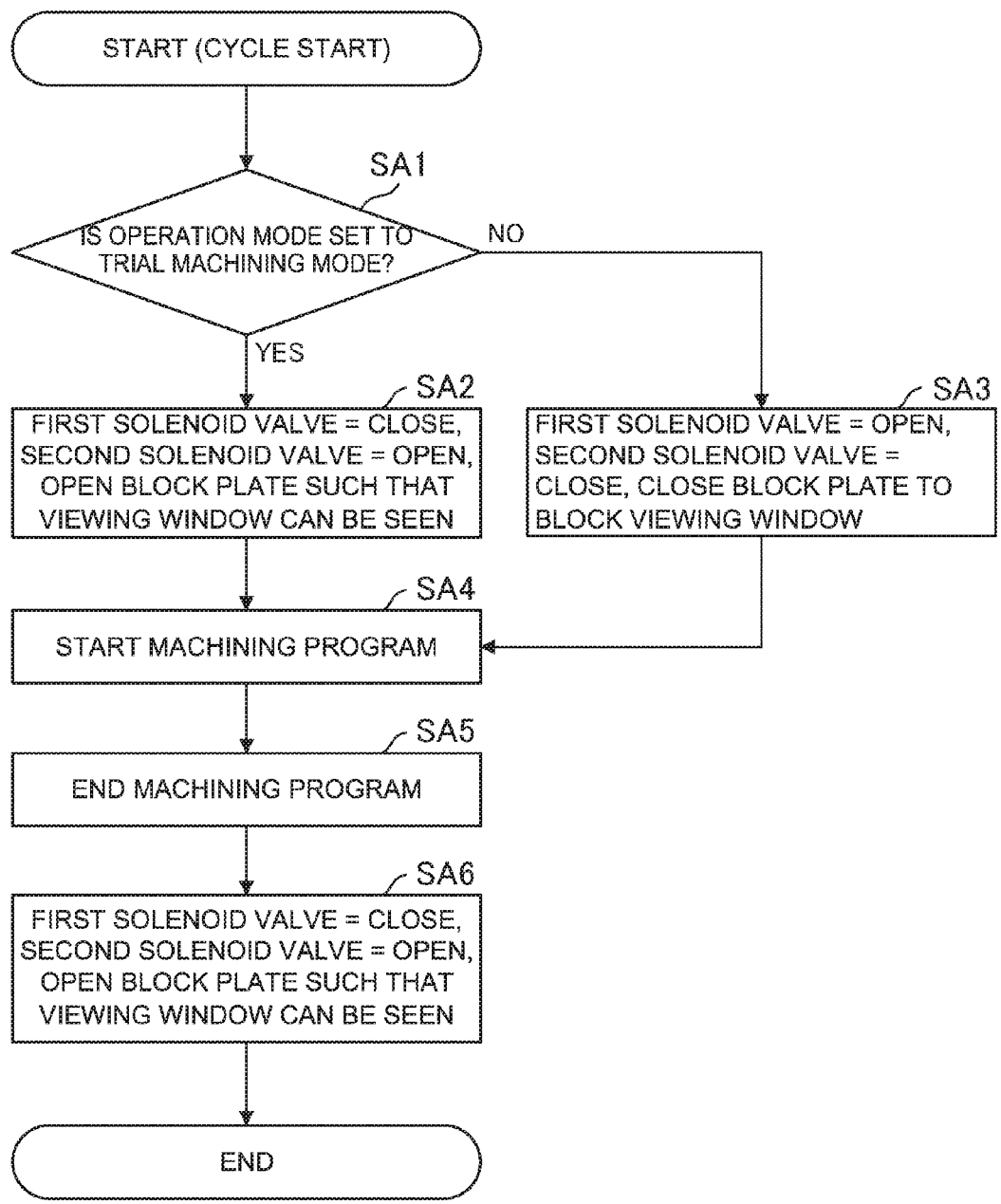

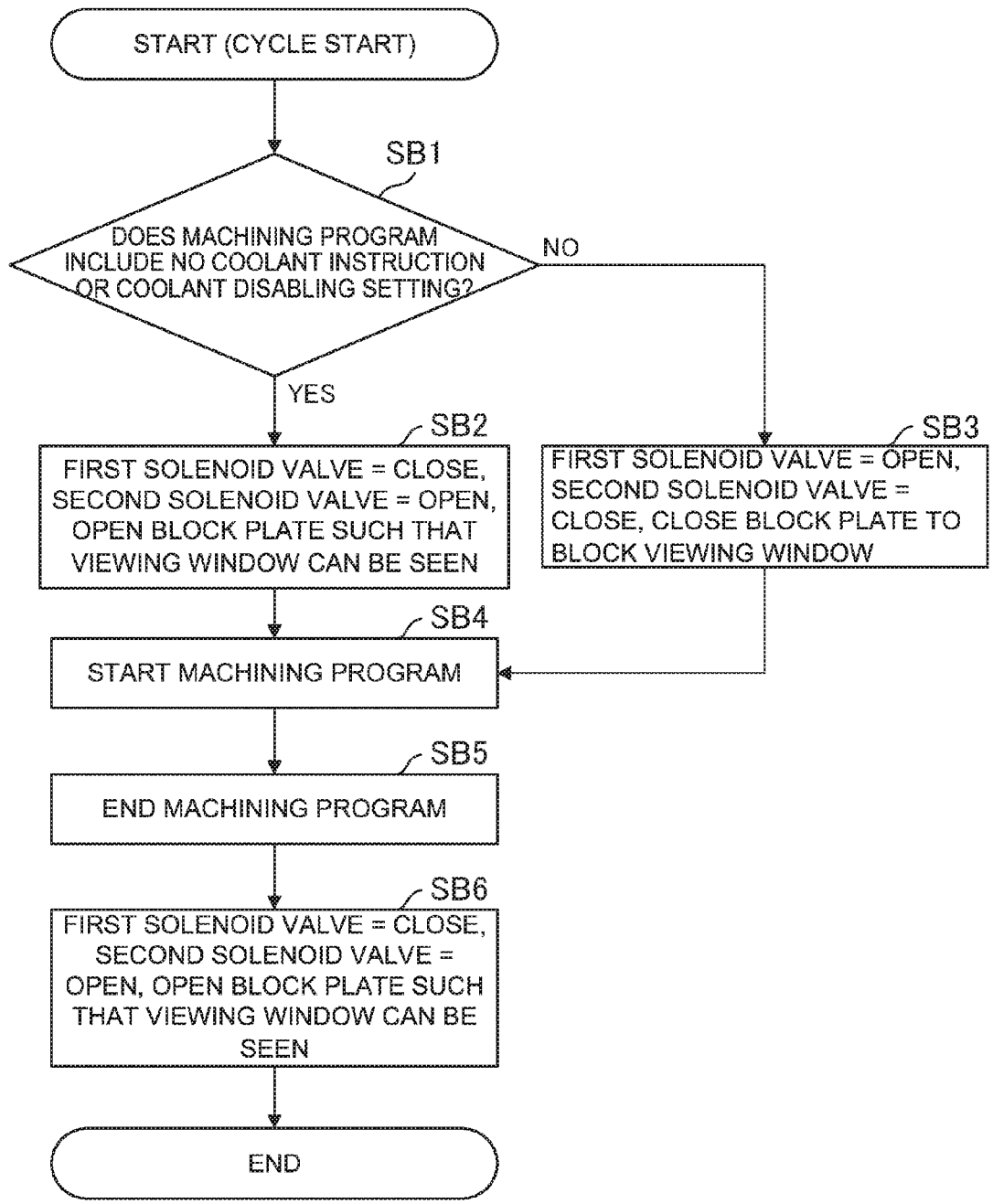

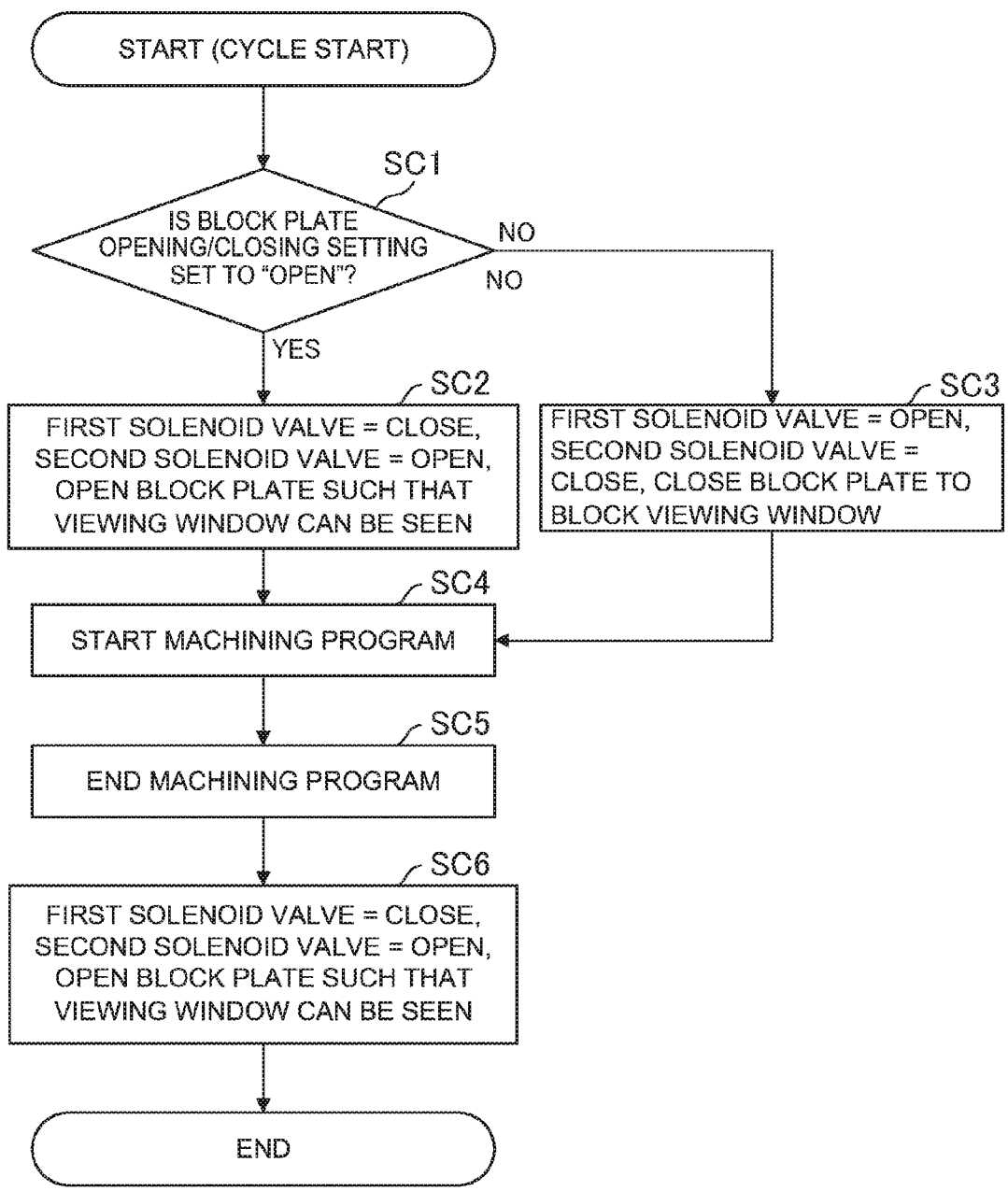

MACHINE TOOL INCLUDING VIEWING WINDOW CONTROLLER

RELATED APPLICATIONS

The present application claims priority to Japanese Application Number 2015-028487, filed Feb. 17, 2015, the disclosure of which is hereby incorporated by reference herein in its entirety.

BACKGROUND OF THE INVENTION

1. Field of the Invention

The present invention relates to machine tools, and in particular, to a machine tool that includes a controller for controlling a viewing window.

2. Description of the Related Art

A transparent viewing window that can be seen from outside is provided in many splash guards or opening/closing doors of machine tools. Such viewing windows are used mainly for machining state observation, and operation check in trial processing or trial working. These viewing windows are indispensable for the machine tools to modify a machining program or to complete the machining program.

However, its visibility is decreased when coolant used in an actual cutting operation or swarf flies to gradually adhere to the viewing window. To remove the adhering substances from the viewing window, some methods of blowing air to clean the substances or methods of cleaning the substances with a wiper are provided. However, it is difficult to completely remove the adhering substances caused by the coolant from the viewing window with air or the wiper, and in some cases, it is difficult to look the inside of the machine tool. To solve the problems, Japanese Unexamined Utility Model Registration Application Publication No. 61-184644 discloses a double structure for covering a viewing window with a block plate to prevent the generation of smudges due to adhesion of coolant to the viewing window.

Japanese Unexamined Utility Model Registration Application Publication No. 61-184644 discusses that a block plate may be opened or closed manually, automatically, or by any method (lines 8 to 9 in page 4). However, the publication does not refer to automatic determination of the necessity of blocking the viewing window with the block plate. Accordingly, the operator has to open or close the block plate when the operator determines that it is necessary to block the viewing window with the block plate, and this operation is troublesome for the operator.

SUMMARY OF THE INVENTION

An object of the present invention is to provide a machine tool that includes a viewing window controller capable of automatically determining whether to block a viewing window with a block plate and capable of controlling opening or closing operation of the block plate.

A machine tool according to an aspect of the invention includes a viewing window attached to a splash guard or an opening/closing door, the viewing window for observation of a machining area, and a block plate provided inside the viewing window, the block plate for blocking the viewing window. The machine tool includes an actuator for driving the block plate to switch states between a state in which the machining area can be seen from outside the viewing window and a state in which the machining area cannot be seen from outside the viewing window, an operation mode determination unit for determining an operation mode of the machine tool, and a controller for driving the actuator according to the determination result by the operation mode determination unit to control opening or closing operation of the block plate.

A machine tool according to another aspect of the invention includes a viewing window attached to a splash guard or an opening/closing door, the viewing window for observation of a machining area, and a block plate provided inside the viewing window, the block plate for blocking the viewing window. The machine tool includes an actuator for driving the block plate to switch states between a state in which the machining area can be seen from outside the viewing window and a state in which the machining area cannot be seen from outside the viewing window, an operation mode determination unit for determining an operation mode of the machine tool at the time of start of operation of the machine tool by a machining program, and a controller for driving the actuator according to the determination result by the operation mode determination unit to control opening or closing operation of the block plate.

A machine tool according to still another aspect of the invention includes a viewing window attached to a splash guard or an opening/closing door, the viewing window for observation of a machining area, and a block plate provided inside the viewing window, the block plate for blocking the viewing window. The machine tool includes an actuator for driving the block plate to switch states between a state in which the machining area can be seen from outside the viewing window and a state in which the machining area cannot be seen from outside the viewing window, and a controller for driving the actuator according to an issued coolant instruction in a machining program to control opening or closing operation of the block plate at the time of start of operation of the machine tool by the machining program.

A machine tool according to still another aspect of the invention includes a viewing window attached to a splash guard or an opening/closing door, the viewing window for observation of a machining area, and a block plate provided inside the viewing window, the block plate for blocking the viewing window. The machine tool includes an actuator for driving the block plate to switch states between a state in which the machining area can be seen from outside the viewing window and a state in which the machining area cannot be seen from outside the viewing window, a block plate opening/closing setting unit for setting opening or closing of the block plate in advance, and a controller for driving the actuator according to the block plate opening/closing setting set in advance to the block plate opening/closing setting unit to control opening or closing operation of the block plate at the time of start of operation of the machine tool by a machining program.

With the above-mentioned structures, machine tools that include a viewing window controller capable of automatically determining whether to block a viewing window with a block plate and capable of controlling opening or closing operation of the block plate can be provided.

BRIEF DESCRIPTION OF THE DRAWINGS

The above and other objects, features of the present invention will become apparent from the following description of embodiments with reference to the attached drawings.

FIG. 3 is a flowchart for automatically determining whether to block the viewing window depending on an operation mode.

FIG. 4 is a flowchart for automatically determining whether to block the viewing window depending on whether a coolant instruction has been issued.

FIG. 5 is a flowchart for automatically determining whether to block the viewing window according to a block plate opening/closing setting.

DETAILED DESCRIPTION OF THE PREFERRED EMBODIMENTS

Figure 1:
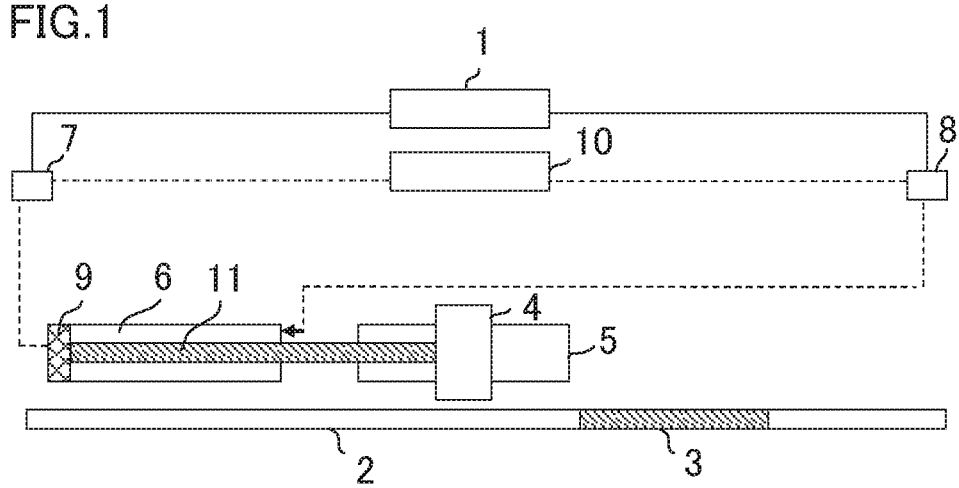
FIG. 1 shows a state in which a block plate for blocking a viewing window is open.
Figure 2:
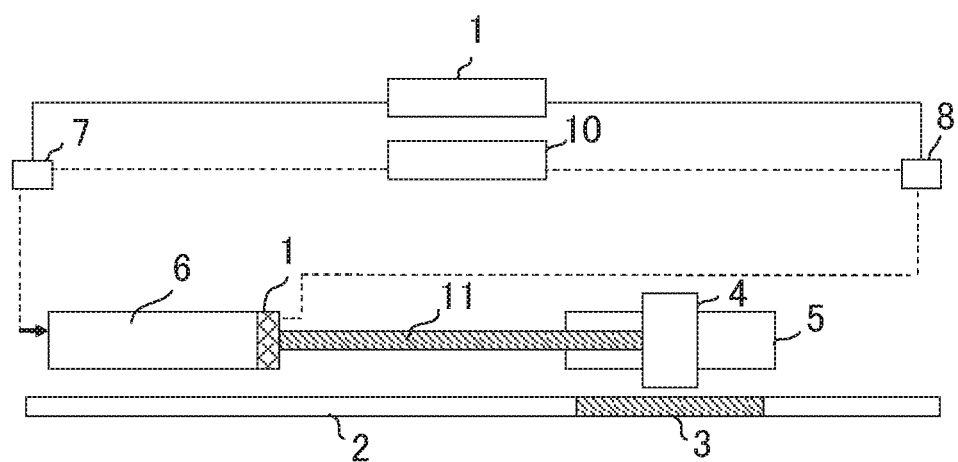
FIG. 2 shows a state in which the block plate for blocking the viewing window is closed.

Hereinafter, embodiments of the present invention will be described with reference to the attached drawings. FIG. 1 shows a state in which a block plate for blocking a viewing window is open and a machining area can be seen. FIG. 2 shows a state in which the block plate for blocking the viewing window is closed and the machining area cannot be seen. FIG. 1 and FIG. 2 show the viewing window and the block plate viewed from above.

A machine tool includes a splash guard 2 to which an opening/closing door (not shown) is attached. The splash guard 2 covers a machining area of the machine tool to prevent swarf produced during machining of a workpiece or coolant supplied to a portion of the workpiece or other parts during machining and the like from flying outside the machine tool. A viewing window 3 is attached to the splash guard 2 or the opening/closing door for operators to observe a machining state of a workpiece being processed by the machine tool from the outside of the machining tool. Such a structure of the machine tool is similar to those of conventional machine tools. FIGS. 1 and 2 show the viewing window 3 that is attached to the splash guard 2. The viewing window 3 may be attached to the opening/closing door (not shown).

The machine tool according to the embodiment of the invention includes a block plate 5 that is supported slidably in a lateral direction or a longitudinal direction along the splash guard 2 or the opening/closing door. The block plate 5 is disposed inside the viewing window 3 provided to the splash guard 2 or the opening/closing door that covers the machining area. The machine tool also includes an actuator that drives the block plate 5 to move along the splash guard 2 or the opening/closing door. With this structure, the viewing window 3 can be switched between a state in which the machining area can be seen from the outside (that is, from an external area of the machine tool) and a state in which the machining area cannot be seen from the outside.

As illustrated in FIGS. 1 and 2, the actuator includes a piston 9, a rod 11, an air cylinder 6 into which the piston 9 and the rod 11 are inserted, an air source 10 for supplying air to the air cylinder 6, and a first solenoid valve 7 and a second solenoid valve 8 for controlling the air supply from the air source 10 to the air cylinder 6. An end of the rod 11 is connected to the piston 9, and the other end is connected to a block 4 to which the block plate 5 is connected. The air source 10 supplies compressed air to the air cylinder 6 to drive the piston 9 in the air cylinder 6. It is preferable that the first solenoid valve 7 and the second solenoid valve 8 are solenoid valves that can switch the supply of compressed air to the air cylinder 6 and the discharge of air from the air cylinder 6. The actuator may be driven by a drive unit such as a motor instead of the air drive.

A controller 1 controls the air source 10, the first solenoid valve 7, and the second solenoid valve 8 to open or close the block plate 5, and thereby to switch states between a state in which the inside of the machine tool can be observed through the viewing window 3, and a state in which the inside of the machine tool cannot be observed through the viewing window 3. In FIG. 1, a signal line between the controller 1 and the air source 10 is omitted. The controller 1 may include a setting unit (not shown) for setting a trial machining mode. Alternatively, the controller 1 may include a setting unit for setting an open state or a closed state of the block plate in advance. The controller 1 may set the block plate 5 to the open state if the trial machining mode has been set. Alternatively, the controller 1 may control the block plate 5 to open or close depending on a state set in advance if the open state or the closed state of the block plate 5 has been set in advance.

According to an instruction of opening or closing the block plate 5 from the controller 1, the first solenoid valve 7 and the second solenoid valve 8 supply compressed air supplied from the air source 10 to the air cylinder 6 to operate the block 4 in a uniaxial direction. The block plate 5 is attached to the block 4, and the block plate 5 operates similarly to the block 4 in response to the operation of the block 4. In other words, by the opening or closing operation of the block plate 5, the state can be switched between the state in which the machining area can be seen through the viewing window 3, which is attached to the splash guard 2 or the opening/closing door of the machine tool, and the state in which the machining area cannot be seen through the viewing window 3.

The structure for blocking the viewing window 3 with the block plate 5 is not limited to this structure, and any structure can be employed as long as a structure includes the block plate 5 provided inside the viewing window 3, and the opening/closing operation of the block plate 5 can be controlled by the controller 1. Further, as long as the viewing window 3 is blocked, the whole or a part of the viewing window 3 may be blocked, and the size of the viewing window 3 and the size of the block area are not limited to certain sizes.

FIG. 3 to FIG. 5 show control flows to be performed by the controller 1. FIG. 3 is a flowchart for automatically determining whether the viewing window is to be blocked depending on an operation mode. In response to pressing a cycle start button, the processing proceeds to step (SA1), and the controller 1 determines whether an operation mode is in a trial machining mode (operation mode determination unit). The trial machining mode is a mode for checking the operation of a machining program after the creation of the program, and the trial machining mode refers to a mode in which the operation check can be performed while an axial moving speed of each axis of the machine tool is controlled to a low speed.

If the operation mode is the trial machining mode, the processing proceeds to step (SA2). In step (SA2), the controller 1 closes the first solenoid valve 7 and open the second solenoid valve 8 to open the block plate 5 such that the viewing window 3 can be seen. Then, the processing proceeds to step (SA4). If the operation mode is not the trial machining mode, the processing proceeds to step (SA3). In step (SA3), the controller 1 opens the first solenoid valve 7 and closes the second solenoid valve 8 to close the block plate 5 such that the viewing window 3 is blocked. Then, processing proceeds to step (SA4).

The controller 1 starts a machining program (step (SA4)), and in response to the completion of the processing of the workpiece, the controller 1 ends the machining program (step (SA5)). The controller 1 closes the first solenoid valve 7 and opens the second solenoid valve 8 to open the block plate 5 such that the machining area can be seen through the viewing window 3 (step (SA6)). If the machine tool includes a plurality of viewing windows 3, one or more of the viewing windows may be blocked. In the flowchart in FIG. 3, prior to the start of step (SA4), it is assumed that the machining program has been loaded and an analysis has been started. The expression "at the time of start of operation by a machining program" in the description of claims of the invention refers to the time of execution of the processing according to the flow shown in FIG. 3. If the machine tool includes a plurality of viewing windows 3, one or more of the viewing windows may be blocked.

FIG. 4 is a flowchart for automatically determining whether the viewing window is to be blocked depending on the presence or absence of a coolant instruction. Prior to the start of step (SB1), a machining program has been loaded and analysis has been performed, and the controller 1 acquires information about whether the machining program includes a predetermined coolant instruction or a coolant disabling setting. In response to pressing a cycle start button, the processing proceeds to step (SB1), and the controller 1 determines whether the machining program includes the coolant instruction or the coolant disabling setting. A coolant disabling setting includes a setting for skipping the coolant instruction in the machining program. If the machining program does not include the coolant instruction, or the machining program include the coolant disabling setting, the processing proceeds to step (SB2). In step (SB2), the controller 1 closes the first solenoid valve 7 and open the second solenoid valve 8 to open the block plate 5 such that the viewing window 3 can be seen. Then, the processing proceeds to step (SB4).

If the machining program includes the coolant instruction, or the coolant enabling setting, the processing proceeds to step (SB3). In step (SB3), the controller 1 opens the first solenoid valve 7 and closes the second solenoid valve 8 to close the block plate 5 such that the viewing window 3 is blocked. Then, the processing proceeds to step (SB4). The controller 1 starts the machining program (step (SB4)), and in response to the completion of the processing of the workpiece, the controller 1 ends the machining program (step (SB5)). The controller 1 closes the first solenoid valve 7 and opens the second solenoid valve 8 to open the block plate 5 such that the machining area can be seen through the viewing window 3 (step (SB6)).

At the time of start of operation by a machining program is the time of execution of the processing according to the flow shown in FIG. 3. If the machine tool includes a plurality of viewing windows 3, one or more of the viewing windows may be blocked.

If the machining program includes a plurality of coolant instructions, the block plate 5 may be opened or closed according to the instructions.

FIG. 5 is a flowchart for automatically determining whether the viewing window is to be blocked according to a block plate opening/closing setting. It is assumed that a machining program has been loaded prior to the start of step (SC4). In response to pressing a cycle start button, the processing proceeds to step (SC1), and the controller 1 determines whether a predetermined block plate opening/closing setting is set to "open". The block plate opening/closing setting is a setting for opening or closing the block plate in advance to control opening or closing of the block plate. If the block plate opening/closing setting is set to "open", the processing proceeds to step (SC2). In step (SC2), the controller 1 closes the first solenoid valve 7 and opens the second solenoid valve 8 to open the block plate 5 such that the viewing window 3 can be seen. Then, the processing proceeds to step (SC4). If the block plate opening/closing setting is set to "close", the processing proceeds to step (SC3). In step (SC3), the controller 1 opens the first solenoid valve 7 and closes the second solenoid valve 8 to close the block plate 5 such that the viewing window 3 is blocked. Then, the processing proceeds to step (SC4). The controller 1 starts the machining program (step (SC4)), and in response to the completion of the processing of the workpiece, ends the machining program (step (SC5)). The controller 1 closes the first solenoid valve 7 and opens the second solenoid valve 8 to open the block plate 5 such that the viewing window 3 can be seen (step (SC6)). At the time of start of operation by a machining program is the time of execution of the processing according to the flow shown in FIG. 3. If the machine tool includes a plurality of viewing windows 3, one or more of the viewing windows may be blocked.

According to the embodiments of the invention, an operation mode is determined and the block plate 5 is automatically opened or closed. Consequently, this operation can eliminate the operator's work of opening or closing the block plate 5. Further, opening or closing of the block plate 5 can be controlled according to an operator's request, for example, an operator's request for opening the block plate 5 to observe the conditions in mass-production processing, or an operator's request for closing the block plate 5 to prevent damage due to swarf without coolant supply.

The invention claimed is:

1. A machine tool including a viewing window attached to a splash guard or an opening/closing door, the viewing window for observation of a machining area, and a block plate provided inside the viewing window, the block plate for blocking the viewing window, the machine tool comprising:
    an actuator for driving the block plate to switch states between a state in which the machining area is visible from outside the viewing window and a state in which the machining area is not visible from outside the viewing window;
    an operation mode determination unit for determining an operation mode of the machine tool; and
    a controller for driving the actuator according to the determination result by the operation mode determination unit to control opening or closing operation of the block plate.

2. A machine tool including a viewing window attached to a splash guard or an opening/closing door, the viewing window for observation of a machining area, and a block plate provided inside the viewing window, the block plate for blocking the viewing window, the machine tool comprising:
    an actuator for driving the block plate to switch states between a state in which the machining area is visible from outside the viewing window and a state in which the machining area is not visible from outside the viewing window;
    an operation mode determination unit for determining an operation mode of the machine tool at the time of start of operation by a machining program; and
    a controller for driving the actuator according to the determination result by the operation mode determination unit to control opening or closing operation of the block plate.

3. A machine tool including a viewing window attached to a splash guard or an opening/closing door, the viewing window for observation of a machining area, and a block plate provided inside the viewing window, the block plate for blocking the viewing window, the machine tool comprising:
- an actuator for driving the block plate to switch states between a state in which the machining area is visible from outside the viewing window and a state in which the machining area is not visible from outside the viewing window; and
- a controller for driving the actuator according to an issued coolant instruction in a machining program to control opening or closing operation of the block plate at the time of start of operation by the machining program.

4. A machine tool including a viewing window attached to a splash guard or an opening/closing door, the viewing window for observation of a machining area, and a block plate provided inside the viewing window, the block plate for blocking the viewing window, the machine tool comprising:
- an actuator for driving the block plate to switch states between a state in which the machining area is visible from outside the viewing window and a state in which the machining area is not visible from outside the viewing window;
- a block plate opening/closing setting unit for setting opening or closing of the block plate in advance; and
- a controller for driving the actuator according to the block plate opening/closing setting set in advance to the block plate opening/closing setting unit to control opening or closing operation of the block plate at the time of start of operation by a machining program.

* * * * *